US011480046B2

(12) United States Patent
Krueger et al.

(10) Patent No.: US 11,480,046 B2
(45) Date of Patent: Oct. 25, 2022

(54) NEUTRON ABSORBER-DOPED DRILLING MUD AND CHARACTERIZATION OF NATURAL FRACTURES

(71) Applicant: ConocoPhillips Company, Houston, TX (US)

(72) Inventors: Martin C. Krueger, Houston, TX (US); Elton L. Diniz Ferreira, Houston, TX (US); Edwin Ortega, Houston, TX (US); Thiago B Simoes Correa, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 63 days.

(21) Appl. No.: 17/076,308

(22) Filed: Oct. 21, 2020

(65) Prior Publication Data

US 2021/0115783 A1    Apr. 22, 2021

Related U.S. Application Data

(60) Provisional application No. 62/923,654, filed on Oct. 21, 2019.

(51) Int. Cl.
*E21B 47/002* (2012.01)
*E21B 49/00* (2006.01)
*E21B 37/00* (2006.01)
*E21B 33/14* (2006.01)

(52) U.S. Cl.
CPC .......... *E21B 47/0025* (2020.05); *E21B 49/00* (2013.01); *E21B 33/14* (2013.01); *E21B 37/00* (2013.01); *E21B 2200/20* (2020.05)

(58) Field of Classification Search
CPC .. E21B 47/0025; E21B 49/00; E21B 2200/20; E21B 33/14; E21B 37/00
See application file for complete search history.

(56) References Cited

U.S. PATENT DOCUMENTS

| 3,838,279 A | * | 9/1974 | Schultz | G01V 5/102 |
| | | | | 250/269.6 |
| 4,524,274 A | | 6/1985 | Scott | |
| 4,605,854 A | | 8/1986 | Smith | |
| 6,781,115 B2 | * | 8/2004 | Stoller | G01V 5/04 |
| | | | | 250/266 |
| 7,933,718 B2 | | 4/2011 | McDaniel et al. | |
| 8,214,151 B2 | | 7/2012 | Duenckel et al. | |

(Continued)

FOREIGN PATENT DOCUMENTS

| EP | 2455581 A2 | 5/2012 | |
| WO | WO-2011064540 A2 | * 6/2011 | ............ E21B 43/16 |

OTHER PUBLICATIONS

Duenckel, et al., "Field Application of a New Proppant Detection Technology Society of Petroleum Engineers", doi:10.2118/146744-MS, SPE 146744, Jan. 1, 2011, 15 Pages.

(Continued)

*Primary Examiner* — Silvana C Runyan
(74) *Attorney, Agent, or Firm* — Boulware & Valoir

(57) ABSTRACT

Gadolinium- or boron-doped drilling mud is used during drilling so that it will penetrate all natural cracks in the formation that intersect with the wellbore. Once cased, cemented and washed, the doped mud will only be in the fractures. Pulsed neutron logging is performed, and natural factures thereby characterized.

10 Claims, 9 Drawing Sheets

(56) References Cited

U.S. PATENT DOCUMENTS

| | | | |
|---|---|---|---|
| 8,234,072 B2 | 7/2012 | Smith et al. | |
| 2005/0221495 A1* | 10/2005 | Bell | E21B 47/10 |
| | | | 436/60 |
| 2008/0119375 A1* | 5/2008 | Barmatov | A01N 59/16 |
| | | | 977/810 |
| 2012/0080588 A1 | 4/2012 | Smith, Jr. et al. | |
| 2013/0292109 A1 | 11/2013 | Smith, Jr. et al. | |
| 2013/0341012 A1* | 12/2013 | Belani | E21B 43/26 |
| | | | 166/250.12 |
| 2015/0377011 A1 | 12/2015 | Torres-Verdin et al. | |
| 2017/0167243 A1* | 6/2017 | Guo | G01N 23/025 |
| 2017/0329041 A1* | 11/2017 | Zhang | E21B 47/09 |
| 2019/0094409 A1 | 3/2019 | Mendez | |

OTHER PUBLICATIONS

Grae et al., "Field Study Compares Hydraulic Fracture Diagnostic Technologies Society of Petroleum Engineers", doi:10.2118/152169-MS, SPE 152169, Jan. 1, 2012, 12 Pages.

Torres, et al. "Field Application of New Proppant Detection Technology—A Case History of the Putumayo Basin of Colombia. Society of Petroleum Engineers", doi:10.2118/152251-MS, SPE 152251,2012, Jan. 1, 2012, 14 Pages.

Duenckel, et al.."Environmental Stewardship: Global Applications of a Non-radioactive Method to Identify Proppant Placement and Propped Fracture Height", SPE 166251, Sep. 30, 2013, 17 Pages.

Bartko, et al., "Hydraulic Fracture Geometry Evaluation Using Proppant Detection: Experiences in Saudi Arabia", SPE 168094, May 19, 2013, 17 Pages.

Han, et al., "An Environmentally Friendly Method to Evaluate Gravel and Frac Packed Intervals Using a New Non-radioactive Tracer Technology", OTC 25166, May 5, 2014, 17 Pages.

Liu, J., et al., "A method to evaluate hydraulic fracture using proppant detection, Applied Radiation and Isotopes", 105: 139-143, Aug. 6, 2015, 5 Pages.

Han, X.; Alkhasov, E.; Schoepf, V.; Webster, M.; Zett, A.; Guo, W.; Quintero, L."Impact of accurate and robust nuclear modelling for enhancing reservoir and well surveillance" (2016) Paper presented at the SPWLA 57th Annual Logging Symposium, pp. 1-12.

International Search Report for PCT/US2020/056656 dated Feb. 25, 2021.

\* cited by examiner

NEUTRON ABSORBER-DOPED DRILLING MUD AND CHARACTERIZATION OF NATURAL FRACTURES

PRIOR RELATED APPLICATIONS

This application claims priority to U.S. Ser. No. 62/923,654, filed Oct. 21, 2019 and incorporated by reference in its entirety for all purposes.

FEDERALLY SPONSORED RESEARCH STATEMENT

Not applicable.

REFERENCE TO MICROFICHE APPENDIX

Not applicable.

FIELD OF THE DISCLOSURE

This invention allows a petroleum company or operator to characterize and ultimately predict the impact of natural fractures on unconventional reservoir producibility. It uses, for example, gadolinium- or boron-doped drilling mud that will penetrate natural cracks in the formation. Once the well is cased, cemented and washed, the doped mud can then be imaged using pulsed neutron logging without interference from mud in the annulus or tubing.

BACKGROUND OF THE DISCLOSURE

In petroleum exploration and production, fractures are one of the most common and important geological structures because they have a significant effect on reservoir fluid flow. Despite their importance, the detection and characterization of natural fractures remains a difficult problem for engineers, geologists and geophysicists.

Fractures in the subsurface are zones of anomalous physical properties that can be detected remotely by various means, ranging from simple extrapolation of surface observations (e.g., loss of pressure or fluid) to sophisticated seismic and electromagnetic soundings. In general, methods that probe deeply into the subsurface have a poor ability to spatially resolve the locations of fractures and those with shorter ranges have correspondingly better resolutions.

Since neutrons and gamma rays are both able to penetrate oil well tubing and casing, pulsed neutron logging is attractive for evaluating formations in existing wells through the casing. Pulsed neutron logging has thus been used in the industry for over 50 years for formation evaluation applications and involves an electronic pulsed neutron source and one or more detectors that typically measure neutrons or gamma rays. It has been used in open-hole and cased-hole environments to provide saturation, porosity, shale, and mineralogy information of the well. Its versatility also extends to water flow detection and gravel pack evaluation.

In 2012, Duenckel reported a new technique to detect hydraulic fracture geometry without using radioactive elements by incorporating a high thermal neutron capture compound (HTNCC) into ceramic proppant grains during manufacturing of the proppant. The concentration of the HTNCC in the proppant particles was kept low such to not impact the properties of the proppant.

The HTNCC-containing proppant was pumped during a fracturing operation and into the hydraulically induced fractures. Because these high thermal neutron capture compounds absorbed neutrons, changes to neutron levels were then detected using conventional compensated neutron logs (CNL) or pulsed neutron capture (PNC) tools. To asses induced fractures, the proppant containing zone was scanned using pre- and post-frac compensated neutron logs and the location of the detectable proppants was then determined from a comparison of the two logs.

In 2015, Liu took the method further. That group used a pulsed neutron gamma energy spectra logging tool to determine the placement and height of propped fractures using ceramic proppant doped with $Gd_2O_3$. A Monte Carlo method was utilized to build the logging tools and formation models. The results show that Gd capture gamma rays could be used to evaluate propped fractures and had higher sensitivity to the change of fracture width and traceable proppant content compared with the existing non-radioactive proppant evaluation techniques. Further, only an after-fracture measurement was needed for the new method. The changes in gas saturation and borehole size were shown to have a great impact on determining propped fractures when compensated neutron and pulsed neutron capture tool were used.

Han (2014) showed log examples that illustrated the effective detection of HTNCC tagged proppant placement within fractures and cement. Monte Carlo modeling indicated the possibility of using HTNCC tagged pack material in gravel packs and frac packs. This technological advancement expanded the portfolio of traditional radioactive tracers, while diminishing the downsides of using radioactive tracers such as undesirable environmental, regulatory, and safety issues.

However, the above methods are directed to imaging and/or assessing hydraulic (man made) fractures, and a need still exists to assess the natural fractures that exist in a reservoir even before fracking operations begin. The first step in solving this problem is to be able to precisely measure and characterize fractures in the subsurface. Today, the leading methodology is to collect a bore hole image. This requires an open hole data collection via logging while drilling (LWD) or tubing conveyed (TCL) deployment methods. Each of these methods requires rig time, introduces operational risk, and only measures fractures at the borehole interface.

What is needed in the art are better methods of subterranean fracture detection that alleviate at least some of the above-mentioned problems, limitations and disadvantages.

SUMMARY OF THE DISCLOSURE

The invention adopts the post-frac technology of using Gd or B or other neutron absorber for pulsed neutron logging, but instead of using them after hydraulic fracturing, adapts the methodology to be applied while drilling. The method requires adding these elements directly to the active drilling mud system (pre-frac) for the purpose of characterizing natural fractures. Since the method is pre-frac, several changes to the prior methodology are needed to implement the technology in the new environment.

Generally speaking, the invention is outlined in FIG. 1-7. A well is drilled using a doped drilling mud, which may enter or be exchanged with contents of natural fractures that are encountered by the drill bit. Any suitable neutron capture material can be used, and boron and gadolinium are suitable. The concentration should be such as to balance cost with detectability, but in general B at 100-10,000 ppm and Gd at 1-1000 is approximately suitable, although the composition of the reservoir must be accounted for.

Once the well drilling is complete, the hole is cased, cemented and washed. This is important as it ensures that the only doped drilling mud remaining is that which is trapped in the fractures. At that time the PNL can be run and fracture information obtained. The data can then be analyzed by Monte Carlo simulations, or other methods already available in the art or to be developed as the technology is refined.

Cased hole logging, such as described herein, does not require drilling rig deployment and thus has much reduced overhead time and cost (see below). Cased hole pre-frac environment also provides lower operational risk, and the PNL may resolve several inches past borehole-formation interface allowing for a greater 3D fracture information. Finally, the method allows imaging of conductive fractures under actual borehole conditions.

| Cost estimate comparison: |
| --- |
| Cased Hole PNL—$170M |
| TCL Bore Hole Imager + Rig Time—$700M |

A pulsed neutron capture tool logging system measures the decay rate (as a function of time between the neutron pulses) of the thermal neutron or capture gamma ray population in the formation and the borehole region. From this decay rate curve, the capture cross-sections of the formation $\Sigma fm$ (sigma-fm) and borehole $\Sigma bh$ (sigma-bh), and the formation and borehole decay components can be resolved and determined. The higher the total capture cross-sections of the materials in the formation and/or in the borehole region, the greater the tendency for that material to capture thermal neutrons. Therefore, in a formation having a high total capture cross-section, the thermal neutrons disappear more rapidly than in a formation having a low capture cross-section. This appears as a steeper slope in a plot of the observed count rate versus time.

Any PNL tool can be used in the invention. Halliburton, for example, makes the Reservoir Monitor Tool-I (RMT-I™), the Reservoir Monitor Tool (RMT-3D™) and the Thermal Multigate Decay 3-Detector (TMD-3D™). Probe makes a 3-detector PNL tool—RAS™; Weatherford makes a 5-detector PNL tool Raptor 2.0™ and Schlumberger makes PNL tools such as Pulsar™ and PNX™.

A "neutron absorbing material" or "neutron capture material" will absorb neutrons to a larger extent than the reservoir rock, such that fracture zones will be detectable using a PNL. Thus, one must have an idea of reservoir lithography in order to pre-select a neutron absorber to differentiate fractures from the rock. See Table 1 for typical reservoir components and their capture neutron cross sections:

TABLE 1

| Theoretical Macroscopic Capture Cross Sections Of Materials | |
| --- | --- |
| Mineral | Capture Cross Section (c.u.) |
| Quartz | 4.3 |
| Calcite | 7.3 |
| Dolomite | 4.8 |
| Glauconite | 25 |
| Chlorite | 25 |
| Shale | 35-55 |
| Fresh water | 22 |
| Gas | 0-12 |
| Oil | 18-22 |
| Brine (50 kppm NaCl) | 35-40 |
| Brine (200 kppm NaCl) | 95-100 |

Either increased neutron absorption, or decreased neutron absorption may be detected in natural fractures, depending on reservoir rock characteristics and availability of neutron absorbers.

The neutron absorbing material is preferably selected from gadolinium, boron, cadmium, iridium, or mixtures thereof, one or more of which are added to the drilling mud at a concentration ranging from 0.01% to 5%, preferably 0.03-1%. The person of ordinary skill in the art will recognize that different agents are used in differing concentrations according to their relative neutron absorbing capacity and cost, e.g., 0.1-10% or 0.5-2% boron hydride v. 0.01-5% or 0.02-0.05% gadolinium oxide. See FIG. 9.

As used herein, a high thermal neutron capture compound (HTNCC) or neutron absorber is a compound that includes one or more of Gadolinium, Boron, Cadmium, Iridium, Xenon, Hafnium, Cobalt, Samarium, Titanium, Dysprosium, Erbium, Europium, Molybdenum and Ytterbium, and the like. These may be used in compositions such as $Gd_2O_3$, $B_4C$, boric acid, $Mo_2B_5$, hafnium diboride, titanium diboride, dysprosium titanate and gadolinium titanate.

Boron may be used as it has good neutron-absorption cross section that greatly reduces the neutron lifetime measured by a PNL tool, but is also readily available and cost effective (Cost, pure: $1114 per 100 g, bulk $500 per 100 g). This makes it a useful tracer when used in conjunction with pulsed-neutron logging. Boron may be used as the element or in the form of boron carbide ($B_4C$), boron oxide ($B_2O_3$); boron nitride, boric acid, high boron concentrate glass, zinc borate, borax, and combinations thereof.

Boron carbide ($B_4C$) may be a preferred neutron absorber, since the carbon component in the boron carbide is an excellent element to thermalize neutrons while the boron has excellent ability to capture the thermalized neutron. Boron carbide, accordingly, provides for a "one two" combination for neutron measurement. $B_4C$ is also a ceramic and therefore is chemically inert under the existing physical and chemical conditions of a typical hydraulic fracturing operation or a cementing operation.

A gadolinium-based doping agent (e.g., gadolinium oxide nanoparticles at 1750 weight ppm) may be preferred due to its exceptionally high neutron absorption cross section, low cost (Cost, pure: $450 per 100 g bulk: $12 per 100 g), and ready availability. Gadolinium can be used as the element or as gadolinium oxide ($Gd_2O_3$), and the like.

As used herein, "drilling mud" may also be called "drilling fluid". The main functions of drilling fluids include providing hydrostatic pressure to prevent formation fluids from entering into the well bore, keeping the drill bit cool and clean during drilling, carrying out drill cuttings, and suspending the drill cuttings while drilling is paused and when the drilling assembly is brought in and out of the hole. The drilling fluid used for a particular job is selected to avoid formation damage and to limit corrosion of equipment.

Since the fluid is used in drilling mud, not as a proppant in fracturing fluid, the sizing considerations are expected to vary, and smaller particles may be more suitable. Further, since natural fractures are to be penetrated, it may be that a wider range of particle sizes are selected to penetrate a variety of different fracture sizes. Alternatively, very small particles will penetrate any size fracture. Thus, nanoparticles of <100 nm may be preferred, or even smaller.

The three main categories of drilling fluids are: water-based muds (WBs), which can be dispersed and non-dispersed; non-aqueous muds, usually called oil-based muds (OBs); and gaseous drilling fluid, in which a wide range of gases can be used. Along with their formatives, these are used along with appropriate polymer and clay additives for drilling various oil and gas formations. Herein, we used drilling muds that are water or oil based, though water-based muds are more common.

The word "fracture" is used herein as a collective term representing any of a series of discontinuous features in rocks such as joints, faults, fissures and/or bedding planes.

The phrase "natural fracture" is used herein as any fracture that exists in a reservoir before any hydraulic fracturing operation has occurred.

As used herein a "pulsed neutron logging" or "PNL" tool has a neutron generator and at least one detector, though modern instruments may contain two, three or even four detectors. For example, one Schlumberger tool has a high-output pulsed neutron generator (PNG), which is primarily sensitive to fast neutrons, and there are three scintillation gamma-ray detectors for near, far, and deep detection. The near and far detectors use cerium-doped lanthanum bromide ($LaBr_3$:Ce) scintillators, and the deep detector, farthest spaced from the PNG, has an yttrium aluminum perovskite scintillator.

Neutrons are emitted from the source and interact in the surrounding rock in several ways depending on the local geology. Water and hydrocarbons will slow down (thermalize) the neutrons. Neutrons will scatter inelastically from some elements, resulting in the emission of gamma rays, and certain elements will capture the neutrons either right away or after they slow down, emitting gamma rays and reducing the neutron flux. See e.g. FIG. 8. Herein, we mainly use boron, and possibly gadolinium, but other materials may be used.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

It is to be noted that as used herein, the terms "first," "second," and the like do not denote any order or importance, but rather are used to distinguish one element from another. Similarly, top and bottom, and lateral or side do not imply an orientation during use, but are used for convenience and usually in reference to the orientations provided in the figures. Furthermore, all ranges disclosed herein are inclusive of the endpoints and all points therebetween, and are independently combinable.

The following abbreviations are used herein:

| ABBREVIATION | TERM |
| --- | --- |
| LWD | Logging while drilling (LWD) |
| MWD | Measure while drilling |

| ABBREVIATION | TERM |
| --- | --- |
| PNL | Pulsed neuron logging, aka pulsed neuron lifetime and pulsed neutron capture (PNC) or thermal decay time (TDT). |
| TCL | Tubing Conveyed Logging (or pipe conveyed) |

BRIEF DESCRIPTION OF THE DRAWINGS

The file of this patent contains at least one drawing executed in color. Copies of this patent with color drawing(s) will be provided by the Office upon request and payment of the necessary fee.

DETAILED DESCRIPTION

The invention generally relates to methods of imaging or otherwise assessing natural fractures in a well using doped drilling mud and PNL logging.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Figure 1:
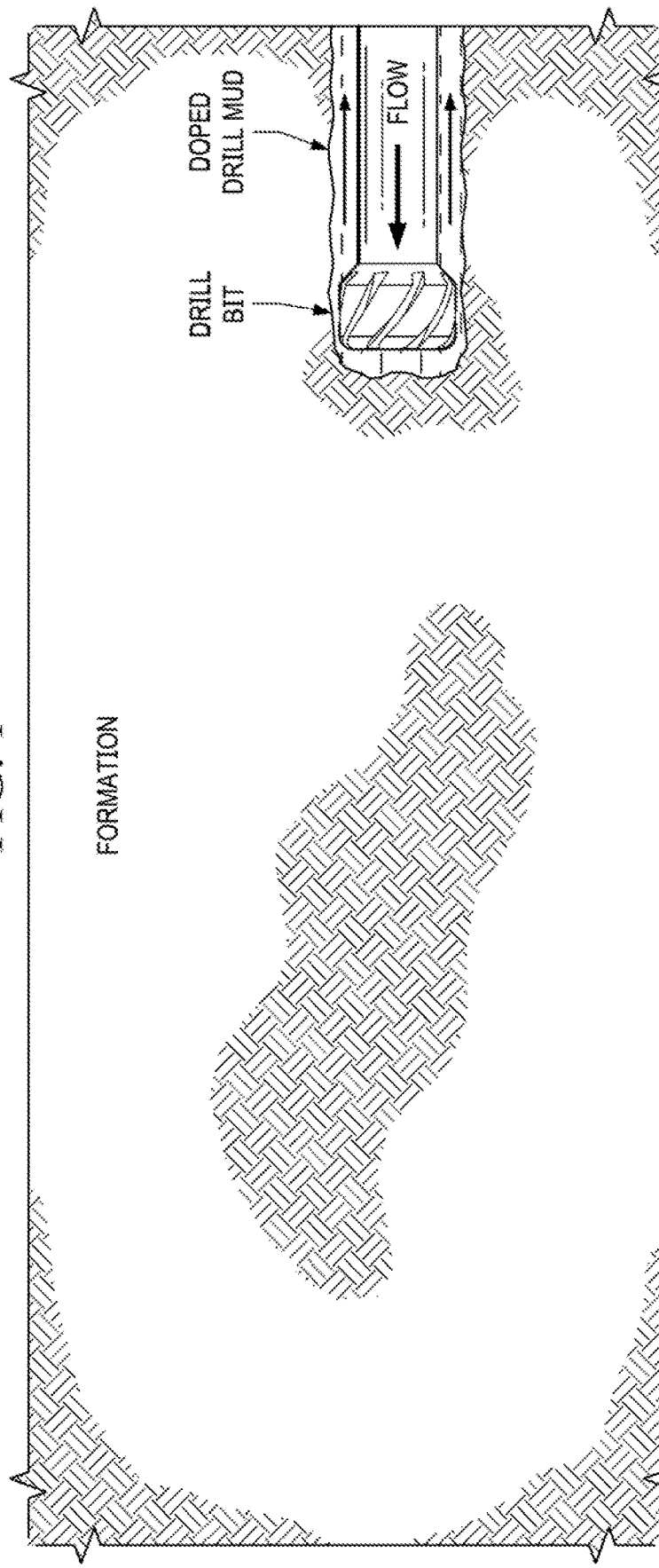
FIG. 1. Drilling a wellbore using drilling mud to lubricate the bit and carry cuttings back to the surface. In the inventive method, the drilling mud is doped with a neutron absorber, such as gadolinium or boron.
Figure 2:
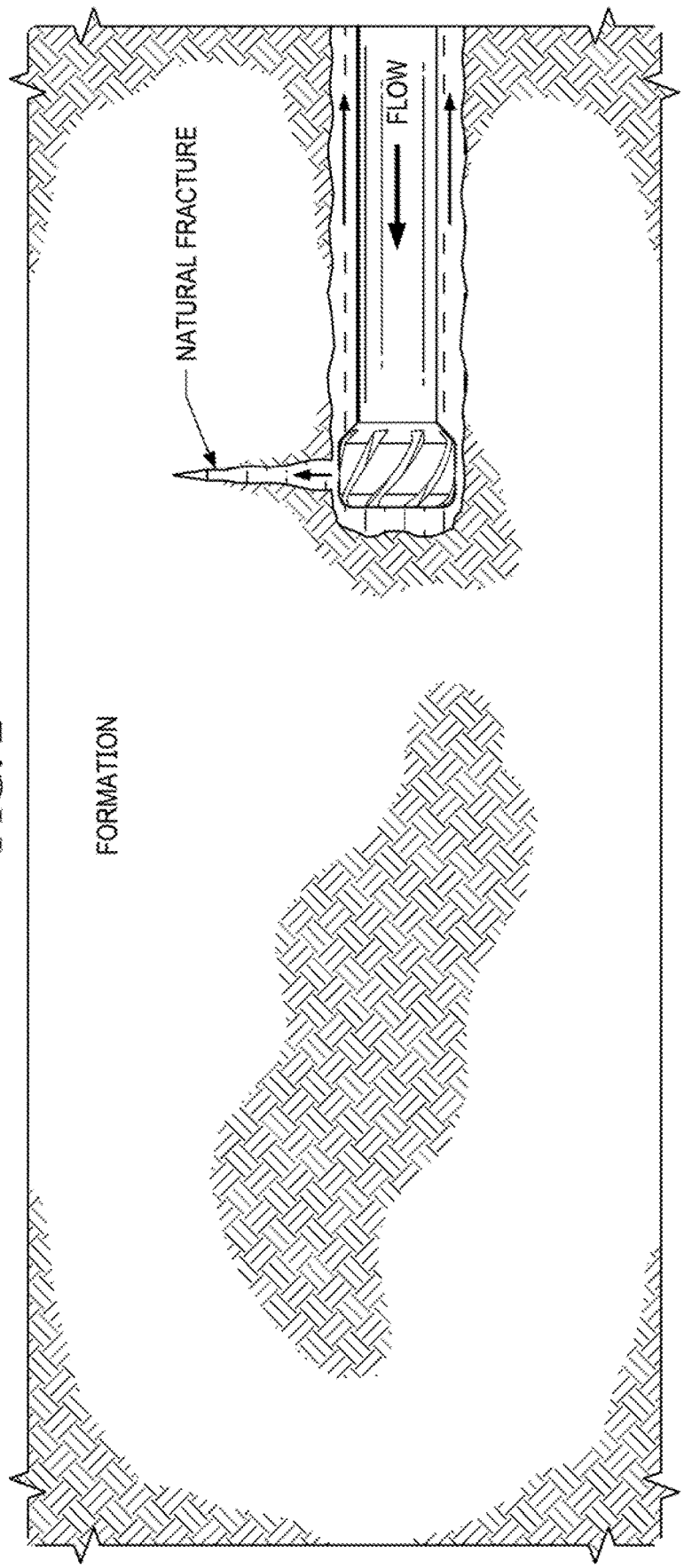
FIG. 2. When a fracture is encountered, a noticeable "fluid loss" occurs until that fracture is brought up to the pressure of the drilling fluid, i.e. the drilling fluid fills the fracture. In the inventive method, the drilling mud entering the fracture contains the neutron absorber.
Figure 3:
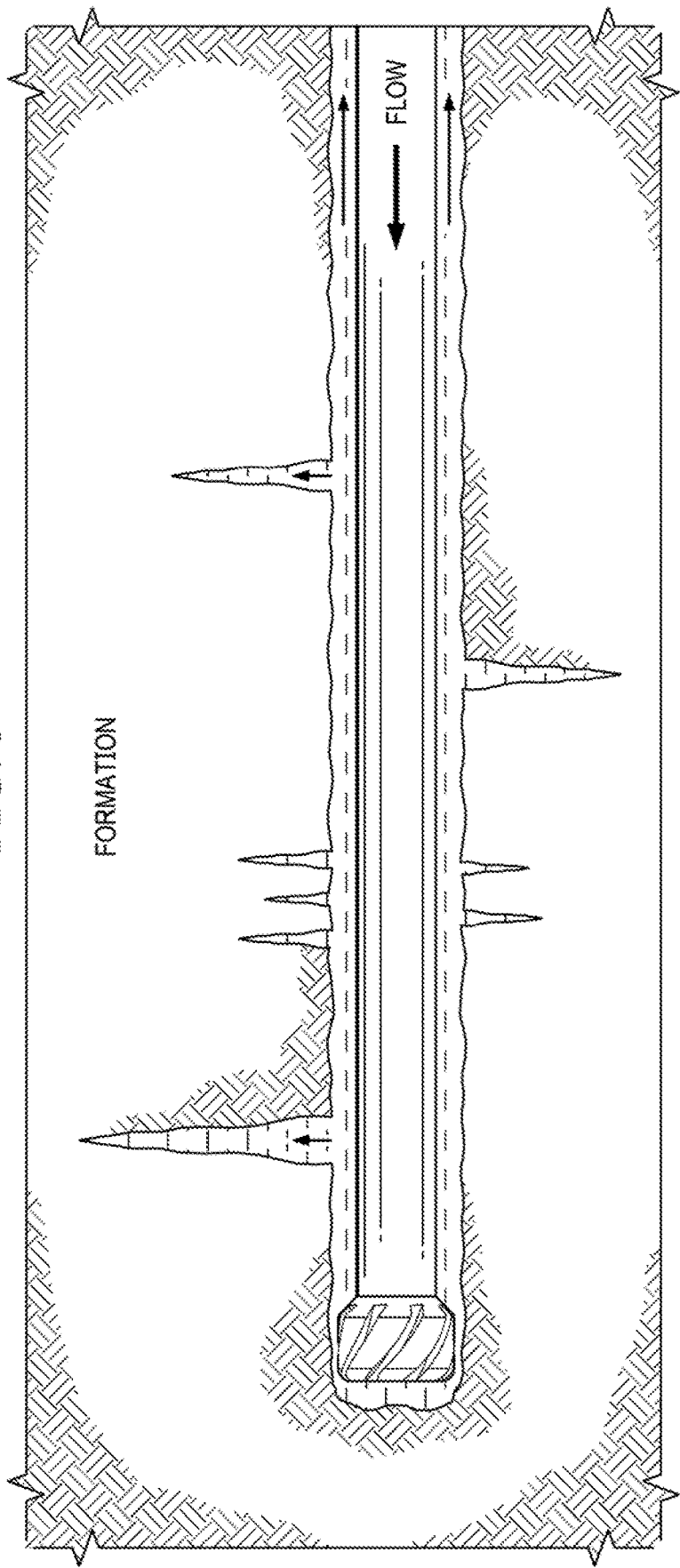
FIG. 3. Additional fractures of differing location, magnitude, frequency, or orientation are encountered during drilling.
Figure 4:
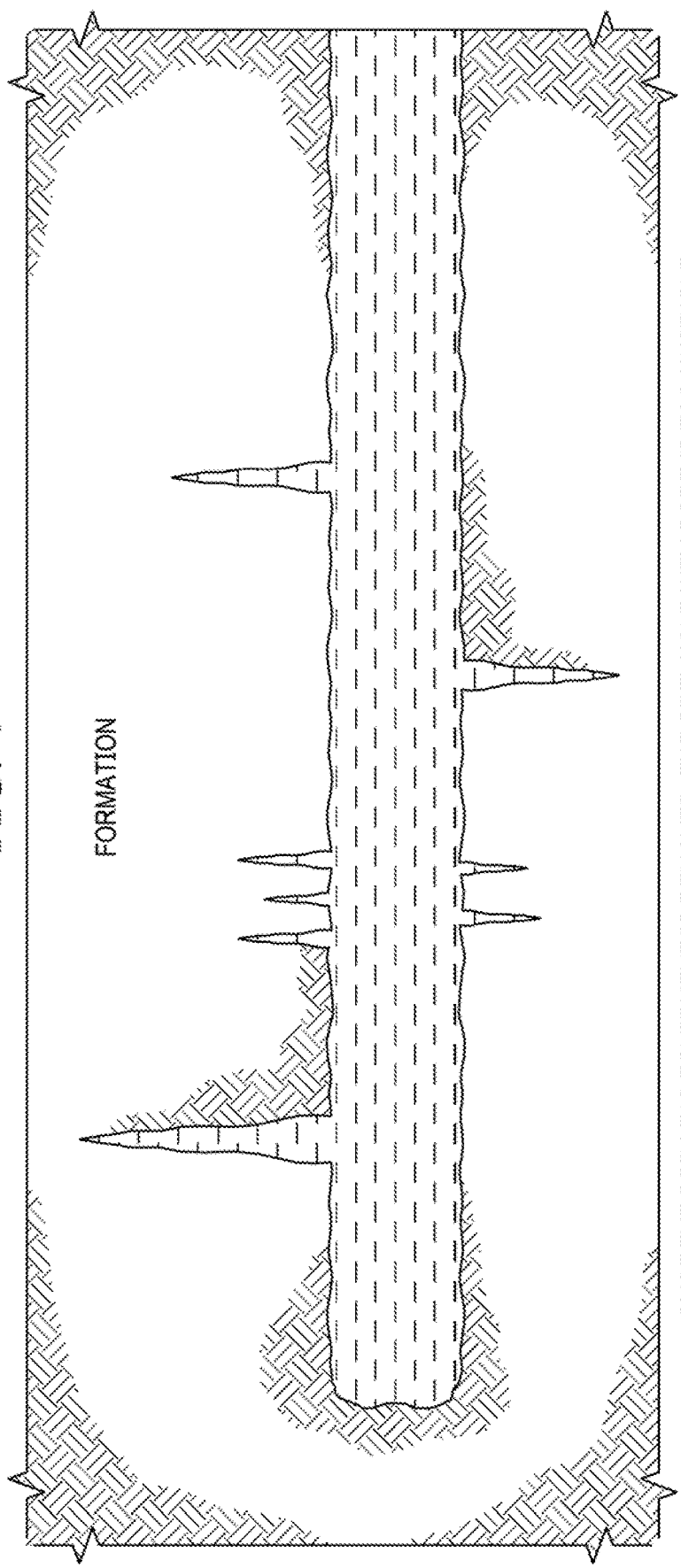
FIG. 4. Openhole wellbore.
Figure 5:
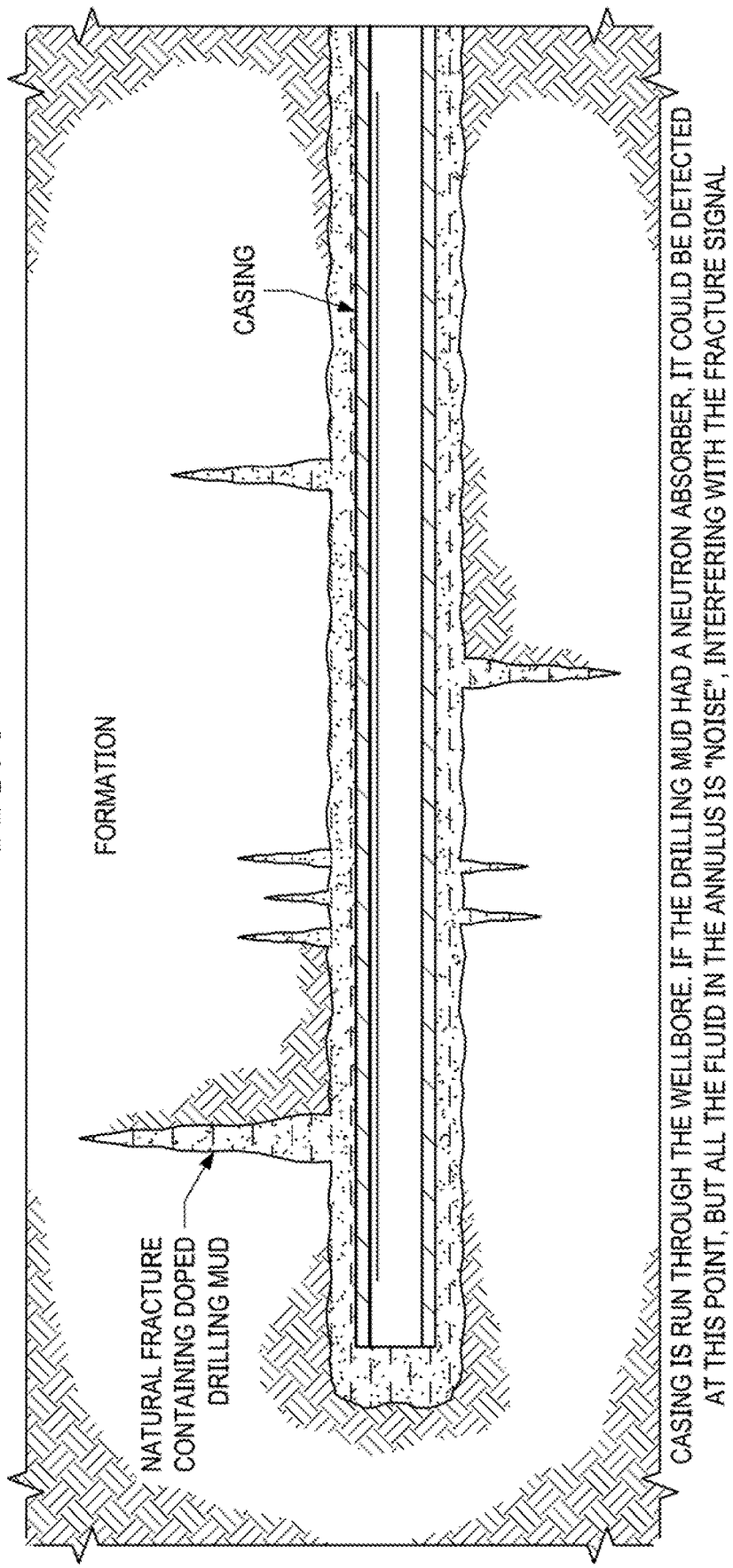
FIG. 5. Cased wellbore. Drilling mud remains in the annulus, interfering with the measurements by adding noise.
Figure 6:
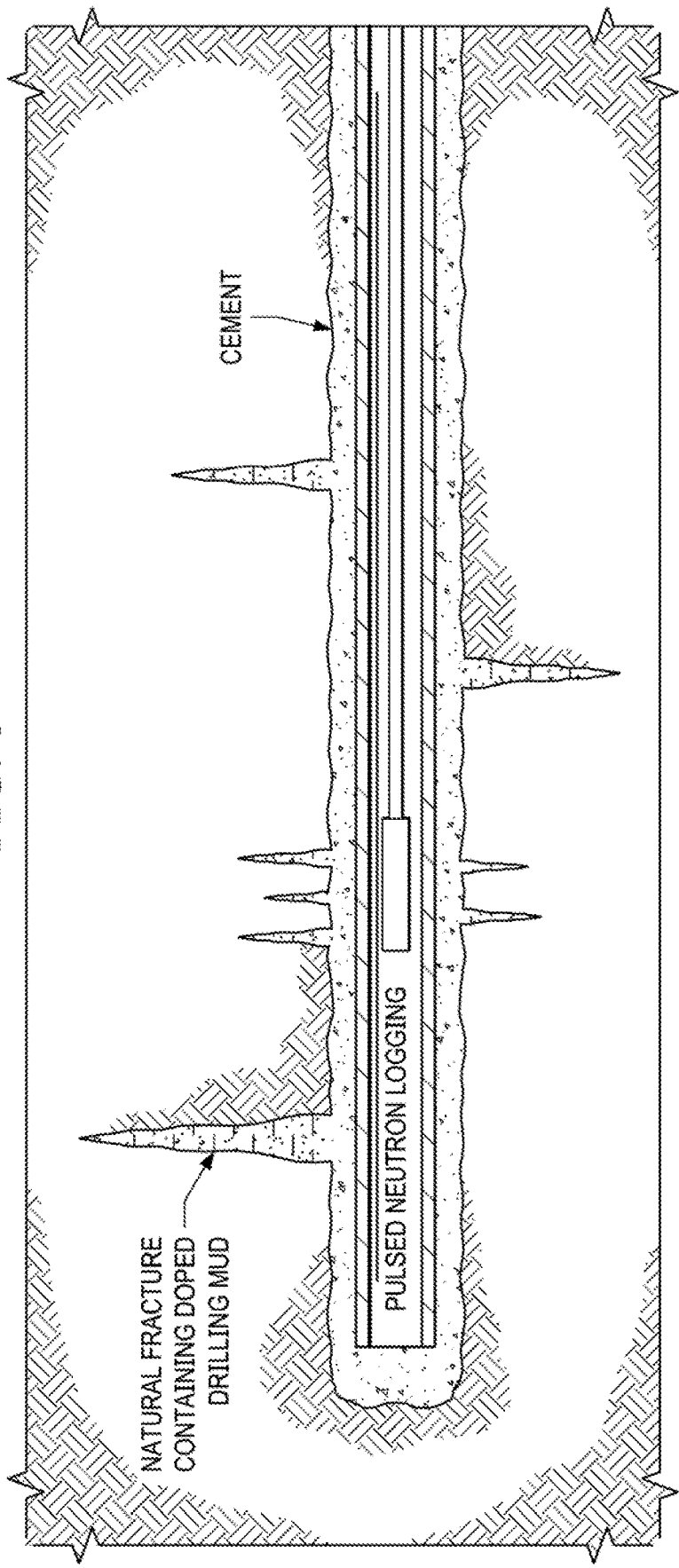
FIG. 6. Cased and cemented and washed wellbore. Now only the fractures contain doped drilling mud, and the well can be successfully logged and natural fractures assessed.
Figure 7:
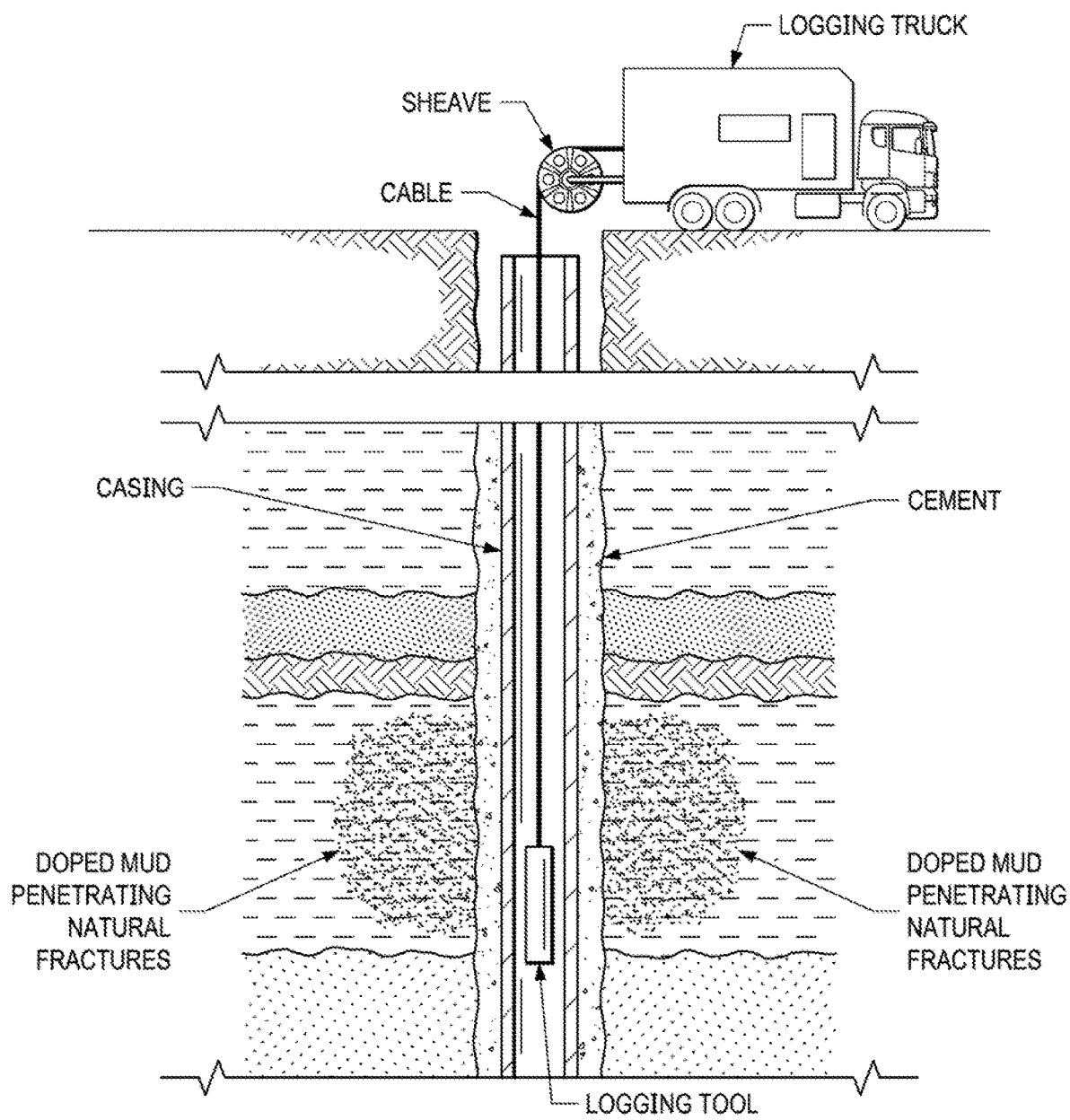
FIG. 7. Simple schematic of PNL logging operations.
Figure 8:
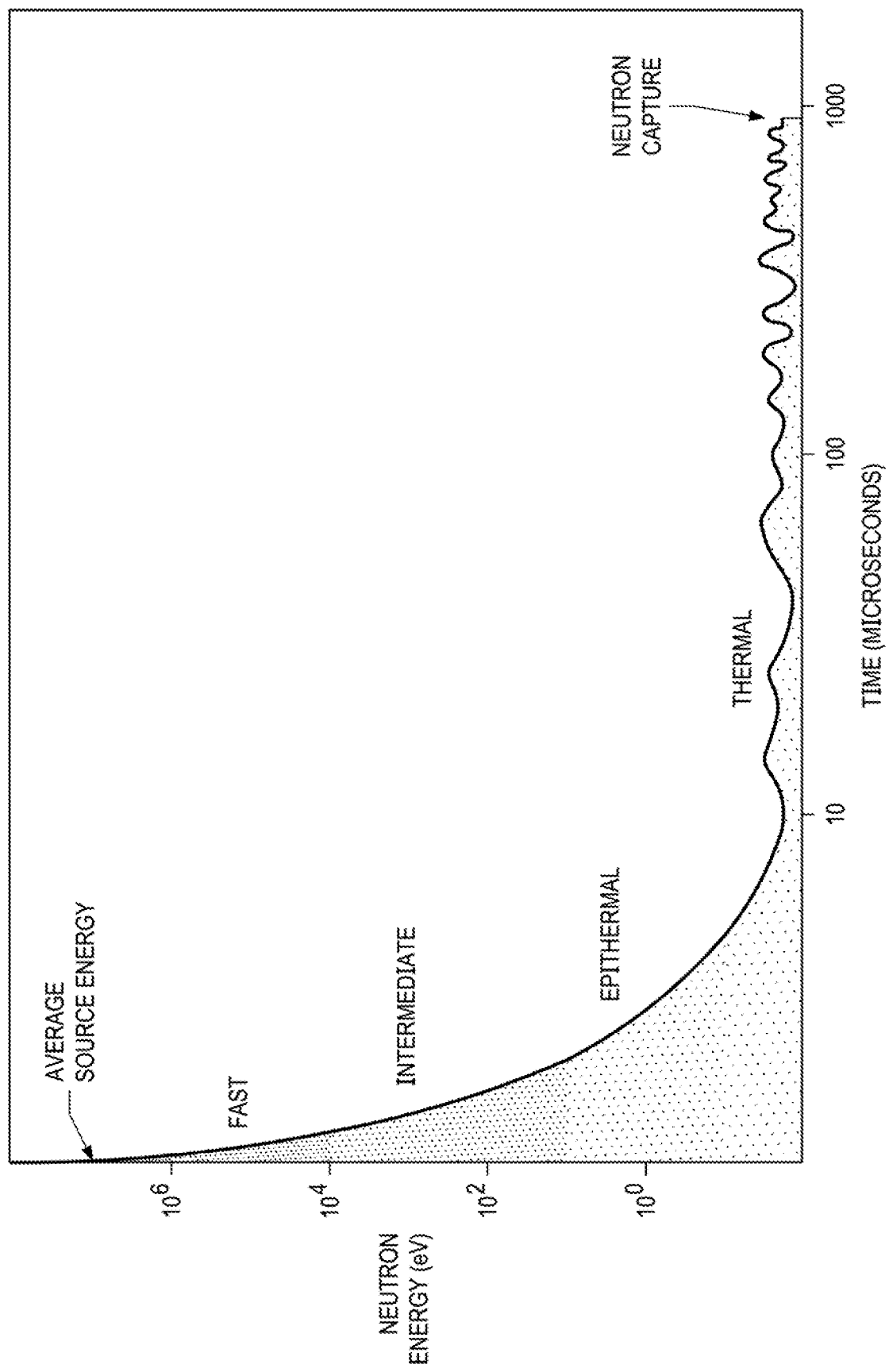
FIG. 8 Neutron energy versus time, showing fast scatter, thermal and capture effects.
Figure 9:
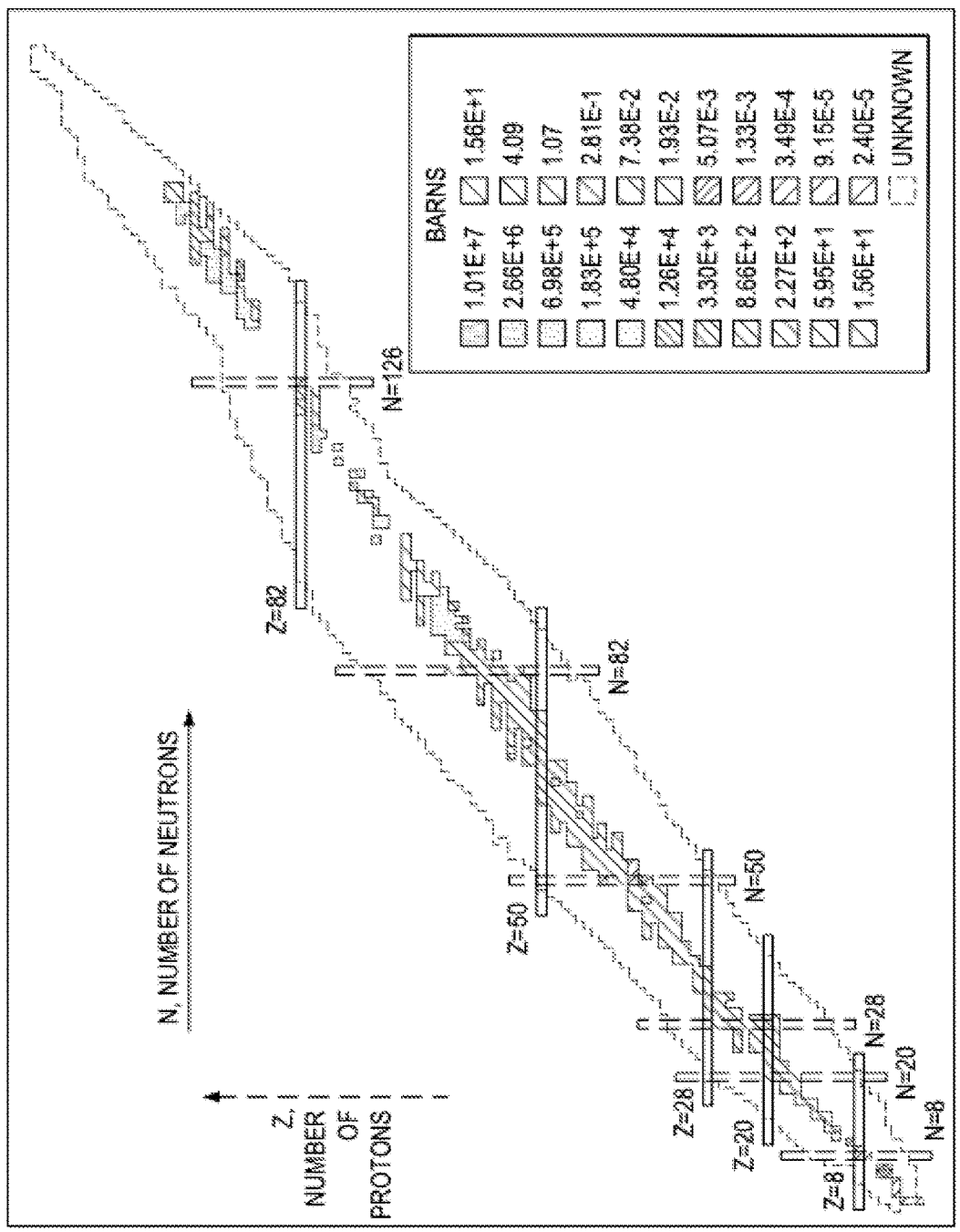
FIG. 9. Absorption neutron cross-section of various materials based on neutron number. The absorption neutron cross-section of an isotope of a chemical element is the effective cross-sectional area that an atom of that isotope presents to absorption, and is a measure of the probability of neutron capture. It is usually measured in barns (b).

FIG. 1 illustrates the drilling of an oil well, in this case horizontal, but that is not important to the invention. The drill bit is lubricated with drilling mud that is doped with, e.g., B or Gd. In FIG. 2, a fracture is encountered, and there is some fluid loss, the pressure returning to normal once the fracture is filled with drilling mud. As well length increases, a variety of different fractures may be encountered, as shown in FIG. 3. When complete, the drilling equipment is removed, but the hole is not stable enough for open hole logging. FIG. 4. Therefore, the well is cased, FIG. 5, and cemented, FIG. 6. Once washed, the PNL tool is deployed, and PNL logs collected, FIG. 7.

The data is then analyzed by known or future developed methods, and usually images of the natural fractures are generated, although this is not a required step. This data is then used to plan the well completion, its fracturing, its stimulation and the like, and those plans are executed and hydrocarbon produced. The natural fracture information is expected to be of particular value in planning hydraulic fracturing operations and in planning any reservoir sweep operations.

The foregoing description and embodiments are intended to illustrate the invention without limiting it thereby. It will be obvious to those skilled in the art that the invention described herein can be essentially duplicated by making minor changes in the material content or the method of manufacture. To the extent that such material or methods are substantially equivalent, it is intended that they be encompassed by the following claims.

The following are each incorporated by reference in its entirety for all purposes.

EP2455581 Methods and compositions for determination of fracture geometry in subterranean formations US20150377011 Tracers for formation analysis US20130292109 Use of PNC tools to determine the depth and relative location of proppant in fractures and the near borehole region US20090210161 Methods of identifying high neutron capture cross section doped proppant in induced subterranean formation fractures US20120080588 Spectral identification of proppant in subterranean fracture zones U.S. Pat. Nos. 8,234,072, 8,214,151 Methods of identifying high neutron capture cross section doped proppant in induced subterranean formation fractures U.S. Pat. No. 7,933,718 Method and tool for determination of fracture geometry in subterranean formations based on in-situ neutron activation analysis SPE 146744 (2011): Duenckel, R. J., Smith, H. D., Warren, W., & Grae, A. (2011, January 1). Field Application of a New Proppant Detection Technology. Society of Petroleum Engineers. doi:10.2118/146744-MS SPE 152169 (2012): Grae, A., Duenckel, R. J., Nelson, J. R., Smith, H. D., Han, X., & Palisch, T. T. (2012, January 1). Field Study Compares Hydraulic Fracture Diagnostic Technologies. Society of Petroleum Engineers. doi: 10.2118/152169-MS SPE 152251 (2012): F. Torres Carreno, F. E., Reinoso, W., Chapman, M. A., Han, X., & Campo, P. (2012, January 1). Field Application of New Proppant Detection Technology—A Case History of the Putumayo Basin of Colombia. Society of Petroleum Engineers. doi:10.2118/152251-MS SPE 166251 (2013): R. J. Duenckel, et al., Environmental Stewardship: Global Applications of a Non-radioactive Method to Identify Proppant Placement and Propped Fracture Height SPE 168094 (2013): K. Bartko, et al., Hydraulic Fracture Geometry Evaluation Using Proppant Detection: Experiences in Saudi Arabia OTC 25166 (2014): X. Han, et al., An Environmentally Friendly Method to Evaluate Gravel and Frac Packed Intervals Using a New Non-radioactive Tracer Technology Liu, J., et al., A method to evaluate hydraulic fracture using proppant detection, Applied Radiation and Isotopes 105: 139-143 (2015).

The invention claimed is:

1. A method of assessing natural fractures in a reservoir, said method comprising:
   a) drilling a well in a reservoir using a drilling fluid doped with a neutron absorbing tracer wherein said doped drilling fluid enters and fills any natural fractures intersecting said well;
   b) casing said well;
   c) cementing said casing;
   d) washing said casing;
   e) deploying a pulsed neutron logging (PNL) tool downhole and collecting PNL log data from said cased, cemented and washed well before any hydraulic fracturing operation has occurred; and
   f) analyzing said PNL log data to provide natural fracture data including one or more of a location, an orientation, or a size of a plurality of said natural fractures intersecting said well.

2. The method of claim 1, wherein said neutron absorbing tracer is selected from the group consisting of boron, cadmium, gadolinium, iridium, or mixtures thereof.

3. The method of claim 2, wherein said drilling fluid is a water-based drilling mud.

4. The method of claim 1, wherein said drilling fluid is a drilling mud doped with boron.

5. The method of claim 1, wherein said drilling fluid is a drilling mud doped with 0.1-10% boron hydride.

6. The method of claim 1, wherein said drilling fluid is a drilling mud doped with 0.01-5% gadolinium oxide.

7. The method of claim 1, wherein said analyzing step produces images of natural fractures in said reservoir.

8. The method of claim 1, further comprising using said natural fracture data for planning and executing one or more of a well completion, a hydraulic fracturing operation, a well stimulation, or a reservoir stimulation, and then producing hydrocarbons from said well.

9. A method of assessing natural fractures in a reservoir, said method comprising:
   a) drilling a well in a reservoir using a drilling fluid doped with a neutron absorbing tracer;
   b) casing said well;
   c) cementing said casing;
   d) washing said casing;
   e) deploying a pulsed neutron logging (PNL) tool downhole and collecting PNL log data from said cased, cemented and washed well before any hydraulic fracturing operation has occurred;
   f) analyzing said PNL log data; and
   g) thereby providing natural fracture data including one or more of a location, an orientation, a width, a height, or a depth of a plurality of natural fractures that intersect or surround said well.

10. The method of claim 9, further comprising using said natural fracture data for planning and executing one or more of a well completion, a hydraulic fracturing operation, a well stimulation, or a reservoir stimulation, and then producing hydrocarbons from said well.

* * * * *